March 8, 1966 R. DENK ET AL 3,239,301
ELECTRICALLY OPERATED MOTION PICTURE CAMERA
Filed Dec. 27, 1963 2 Sheets-Sheet 1

INVENTOR.
RICHARD DENK
HANS GUGELOT
HANS SUKOPP
ERNST REICHL

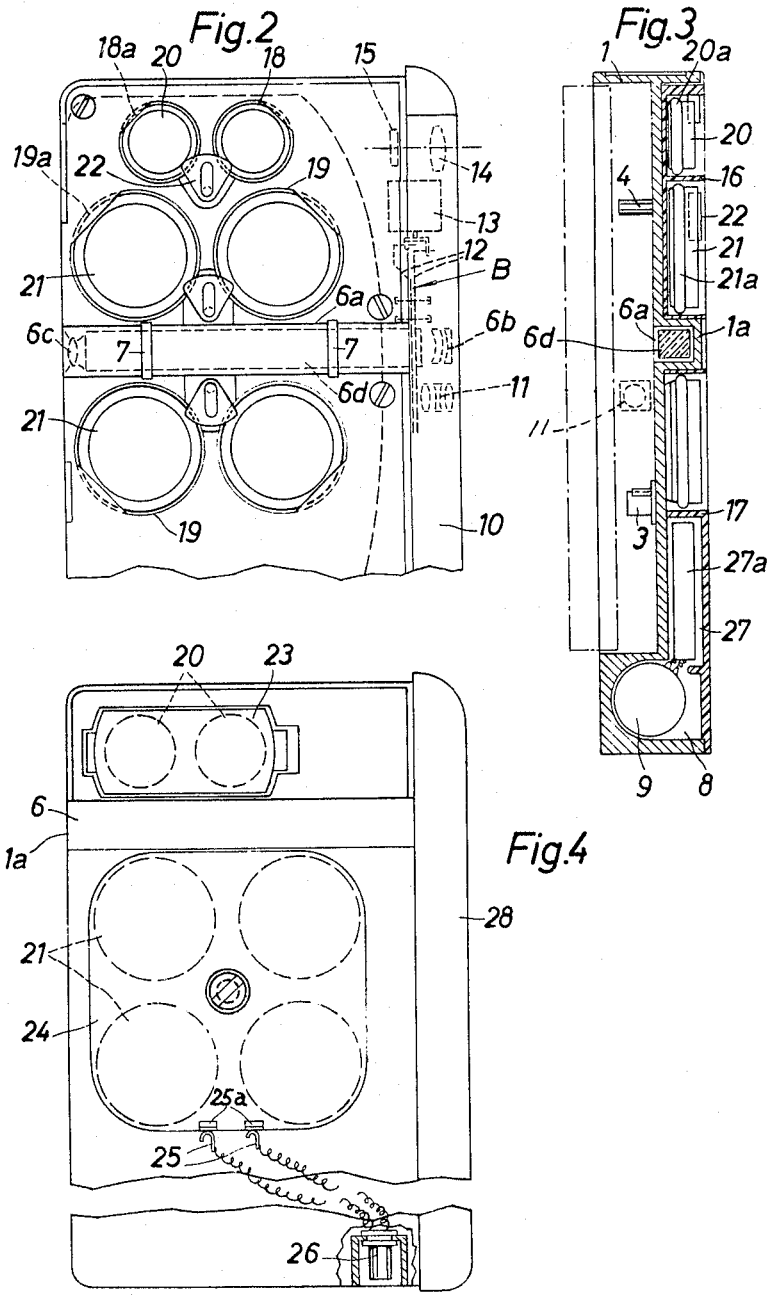

United States Patent Office 3,239,301
Patented Mar. 8, 1966

3,239,301
ELECTRICALLY OPERATED MOTION PICTURE CAMERA
Richard Denk, Munich, Hans Gugelot and Hans Sukopp, Ulm, and Ernst Reichl, Oberelchingen, Germany, assignors to Agfa Aktiengesellschaft, Leverkusen, Germany
Filed Dec. 27, 1963, Ser. No. 333,834
Claims priority, application Germany, Jan. 12, 1963, A 19,390
2 Claims. (Cl. 352—72)

The present invention relates to motion picture cameras, and in particular to electrically driven motion picture cameras which are equipped with automatic exposure controlling devices.

Conventional cameras of the above type generally include a film chamber in which film spools or a magazine may be located, and the electric motor for the camera is generally situated beneath this chamber while the viewfinder is situated above the chamber. In some types of conventional cameras the spools are arranged at the same elevation and where the camera is spring-driven there is beside the film chamber an additional chamber which is large enough for receiving most of the additional components of the camera. Cameras of this conventional construction are rather large and bulky.

It is a primary object of the present invention to provide a motion picture camera wherein all of the parts are arranged in an exceedingly compact manner making it possible to provide a camera of relatively small dimensions which do not substantially exceed the space required for the basic essential camera components with all of the remaining parts of the camera situated in space which is in any event available so that the size of the camera is reduced to a minimum.

In particular it is an object of the present invention to provide not only a camera of small dimensions but also a camera which is exceedingly thin and flat.

A further object of the present invention is to provide a camera of the above type which is adapted to employ an exceedingly thin magazine which contains only a single row of film frames with perforations on only one side of the film strip.

Furthermore, it is an object of the present invention to provide a structure of the above type which is adapted to use for its source of energy relatively flat batteries in the form, for example, of primary dry cells.

Still another object of the present invention is to provide a camera of the above type in which all of the components of the camera while capable of being rendered easily accessible nevertheless are reliably covered with a structure which does not undesirably increase the dimensions of the camera.

Also, it is an object of the present invention to provide for a camera of the above type a structure which enables flat-type primary dry cells to be easily replaced while at the same time being securely mounted in the camera.

In addition, it is an object of the present invention to provide a camera construction wherein cells which are capable of being recharged are connected with conductors which are adapted to be connected to a charging device.

In general, the objects of the preesnt invention include the provision of a camera whose outer dimensions do not exceed the space required for a magazine, an electric motor, and the exposure-controlling structure.

With the above objects in view, the invention includes in a motion picture camera, a relatively thin supporting frame means which defines a magazine-receiving chamber and which carries an electric motor which is situated beneath and closely adjacent to the chamber. An exposure controlling means is located in front of and closely adjacent to the chamber, and beside the chamber the frame means carries battery-receiving means for receiving flat-type, primary dry cells as well as a drive means for driving the film spools. In accordance with the present invention the frame means is in the form of a thin wall part of which has the configuration of an elongated channel which is situated directly beside the magazine chamber and which receives the viewfinder means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a side view of the structure of FIG. 1 as seen in the direction of the arrow II;

FIG. 3 is a transverse sectional view taken along line III—III of FIG. 1 in the direction of the arrows; and FIG. 4 is a schematic side view of another embodiment of a camera according to the invention, the side views of FIGS. 2 and 4 being shown with the camera cover removed.

Figure 1:
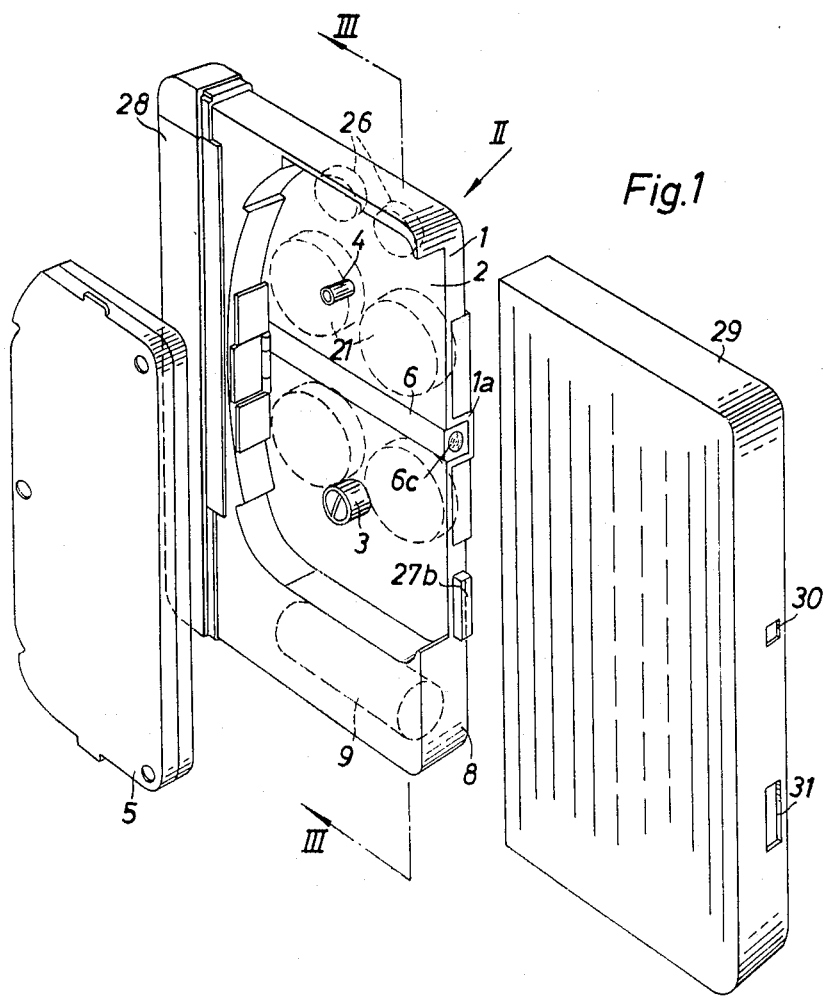
FIG. 1 is a schematic perspective illustration of the camera of the invention as seen when looking toward the rear and side thereof with the magazine and cover removed from the remainder of the camera.

Referring now to the drawings, the camera of the invention includes a supporting frame means which is formed by a wall 1 which is relatively thin and which is shaped from sheet metal, and the configuration of the wall 1 defines a magazine-receiving means in the form of a chamber 2 the configuration of which substantially matches that of the magazine 5 which is shown in FIG. 1. Through a suitable drive means, which is also carried by the frame means 1 a pair of shafts 3 and 4 which extend into the magazine chamber 2 are rotated, and the shaft 3 drives a take-up spool of the magazine while the shaft 4 rotates the supply spool. Of course, as is well known in the art, the construction may be such that only the shaft 3 which turns the take-up spool is driven while the film is withdrawn by the film-advancing claw from the supply spool which is only supported for rotation by the shaft 4. Of course, the shafts 3 and 4 extend through suitable openings in the side wall of the magazine 5 which is not visible into the interior of the magazine and into the hubs of the spools which are located in the magazine 5. In accordance with a further feature of the present invention the width of the chamber 2 is extremely narrow and the magazine 5 accommodates only an 8 mm. film which has but a single row of film frames and which is formed with perforations only along one of its side edges, so that the film itself together with the spools and the entire magazine 5 will have one-half the width of the conventional 16 mm. film which is exposed in such a way as to provide two rows of film frames and afterwards the film is of course longitudinally split to form a single row. Thus, by providing a magazine 5 which accommodates only film for a single row of 8 mm. frames, the magazine 5 as well as the chamber 2 can be made quite narrow. As is particularly apparent from FIGS. 1 and 2 the member which is shaped so as to form the wall 1 has a configuration which provides this wall with an elongated channel 1a which extends horizontally across the wall 1 between its upper and lower edges, and the interior of the channel 1a communicates with the chamber 2 so that on the side of the wall 1 which is opposite from the chamber 2 the channel 1a will form a division separating upper and lower portions of the space on the side of the wall 1 which is directed away from the magazine chamber 2.

The interior space of the elongated channel 1a receives an elongated viewfinder means, and it will be noted that the interior of the channel 1a has a square cross section. The viewfinder means 6 includes an elongated tube 6a which fits snugly within the channel 1a as well as a viewfinder objective 6b and a viewfinder ocular 6c, and between the objective and the ocular of the viewfinder means is located an elongated glass bar 6d which of course extends along the interior of the outer square tube 6a of the viewfinder. A pair of lock members 7 of any suitable construction can be mounted on the wall 1 extending across the channel 1a so as to guarantee that the viewfinder tube 6d remains in the channel, and these lock members 7 can be quite thin so that they do not in any way interfere with the location of the magazine 5 in the chamber 2. These members 7 may simply be thin strips of metal hinged by small rivets, for example, at one of their ends to the wall 1 so that they are turnable to and from the position shown in FIG. 2 in which they may be retained in any suitable way.

As is apparent from FIG. 3, the wall 1 in addition to being shaped as described above so as to form an elongated channel 1a is shaped along its lower portion so as to form the elongated chamber 8 in which an electric driving motor 9 is located, the drive from the camera being derived from the motor 9, and it will be noted that the motor 9 is situated beneath and closely adjacent to the magazine chamber 2, the distance between these portions of the camera being determined solely by the thickness of the wall 1, as is apparent from FIG. 3. Referring to FIGS. 1 and 2, it will be seen that the front edge of the magazine-receiving chamber 2 is curved rearwardly at its upper and lower portions, and in this way there is provided a chamber 10 in front of the magazine chamber 2, and within this chamber 10 which is situated directly in front of the magazine chamber 2 is located the camera objective 11 as well as the exposure-controlling means which is indicated in its entirety at B and which consists essentially of a pair of diaphragm blades 12, a galvanometer 13, and a photosensitive electrical transducer 15 situated behind a lens 14 through which the light reaches the photosensitive transducer 15. Of course, as is well known in the art the transducer 15 may be in the form, for example, of a photocell which is connected to the galvanometer 13 to control the angular position of the moving coil thereof, and this moving coil is connected to the pair of diaphragm blades 12 which can pivot with respect to each other in a manner similar to a pair of scissors blades and which are suitably notched so as to cooperate to determine the size of the aperture, the blades being positioned in accordance with the angular position of the moving coil, so that in this way the aperture will be automatically regulated according to the lighting conditions, as is well known in the art. Of course, the transducer can also take the form of a photosensitive electrical resistor, and in this case a suitable battery will be included in the circuit. Because the magazine is curved at its upper front portion and the chamber 2 is correspondingly curved, there is available at the upper front portion of the camera directly in front of the magazine chamber a space which is sufficient to accommodate such elements as the galvanometer and the other elements of the exposure-controlling means.

It will be noted from the drawings that the exterior dimensions of the camera of the invention exceed only to a small extent the space which is required for the magazine, the motor 9, and the exposure-controlling means B, so that for the most part the dimensions of the camera are determined by the space which is required by these three units, and all of the remaining elements can be accommodated without requiring any substantial increase in the size of the camera. Thus, there is situated beside the chamber 2 on both sides of the channel 1a at the side of the wall 1 which is directed away from the chamber 2 a pair of plastic bodies 16 and 17 which substantially fill the spaces on both sides of the channel 1a at the side of the wall 1 which is directed away from the chamber 2, and these bodies, made of any suitable plastic material, are formed with openings to receive batteries which preferably are flat-type primary dry cells so that the batteries will also contribute to the result of maintaining the camera dimensions at an absolute minimum. The body 16 is formed with openings 18 and 19 which respectively receive the cells 20 and 21, as shown in FIG. 2, while the lower body 17 at its upper portion is formed also with a pair of openings 19 for receiving a pair of additional cells 21. The lower part of the body 17 is in the form of a relatively thin wall which forms a cover for the chambers 8 and 27 indicated in the lower portion of FIG. 3. The cells 20 are used to supply electrical energy for the exposure-controlling means B, the photosensitive transducer 15 being in this case an electrical resistor whose resistance changes in response to changes in light intensity, and the several cells 21 are electrically connected with the motor 9 for providing the energy for driving the motor 9. The cells 20 are each provided with an exterior annular flange 20a, while the cells 21 are each provided with an exterior annular flange 21a, and the bodies 16 and 17 are respectively provided at their openings 18 and 19 with projections 18a and 19a which respectively extend over the flanges of the cells, as shown most clearly in FIG. 2. Moreover, the body 16 pivotally carries a pair of turnable lock members 22 of sector-shaped configuration, and each lock member 22 has a locking position overlying a pair of the flanges of adjoining cells, as indicated in FIG. 2, so that the lock member 22 associated with a given pair of cells can be swung in one direction or the other to release a selected one of the cells which can be tilted so as to slip out of the opening and from behind the projection 18a or 19a, and the cells are introduced through the reverse of these operations. The frictional resistance to turning of the members 22 is sufficient to hold them in their locking or unlocking positions. It will be noted that each cell is engaged by the lock member 22 at a portion of its flange which is diametrically opposed to the projection of the body which overlies the flange, so that in this way each cell is reliably held in place by elements which extend over its flange at diametrically opposed portions thereof.

The embodiment of FIG. 4 differs from that of FIG. 2 in that the cells 20 and 21 are arranged in carrier frames 23 and 24 which can be removed in their entirety from the supporting frame 1. Thus, the carrier 23 is simply in the form of a body formed with openings for the cells 20 and removably carried in any suitable way by the wall 1 at the side thereof which is directed away from the magazine chamber 2, and in the same way the carrier 24 carries the cells 21 and is removably connected in any suitable way to the supporting frame 1. It will be noted furthermore that in the embodiment of FIG. 4 the channel 1a and of course the viewfinder means 6 are both displaced upwardly with respect to the position of these elements in the embodiment of FIG. 2, and this arrangement provides a somewhat more convenient handling of the camera by the operator. The carrier 24 in addition has contacts 25a which are electrically connected to the cells 21 and which serve to provide part of the electrical connection from the cells 21 to the motor 9, and in addition, as is indicated diagrammatically in FIG. 4, the contacts 25a engage contacts 25 electrically connected with prongs 26 capable of being received in a suitable plug which is connected to a charging device through a suitable cable so that in this way where the batteries 21 are rechargeable they may be connected to a charging device so as to have their charge restored. Of course, a similar arrangement for charging the batteries 21 may be provided with the embodiment of FIG. 2.

In both embodiments there is, beneath the cells, the chamber 27 in which is located the transmission 27a which is driven by the motor 9 and which is operatively connected to the rotary shaft 3 for driving the take-up spool, and in addition a footage counter 27b (FIG. 1) is operatively connected to the transmission to be driven thereby.

The camera components are covered at the front portion of the camera by a suitable cap member 28 which is of course provided with openings through which light may reach the objective and the viewfinder as well as the lens 14, and except for the front cap 28 which remains connected with the frame 1 during normal operation of the camera, but which may be removed for servicing the camera or which may be slidably mounted for covering and uncovering the objective, viewfinders, and lens 14, all of the remaining structure of the camera is covered by a single hollow cover member 29 which is only at its front side so that the rear of the camera structure may be slipped into the shell-like cover 29 and moved all the way back into the latter until the front edge of the cover 29 which extends all around the camera engages the shoulder which is just to the rear of the cap 28, as shown in FIG. 1. In this way the single hollow cover 29 can slide onto and off from the wall 1 and may be maintained thereon simply by friction, and this cover 29 will reliably cover and protect all of the components of the camera while at the same time making the entire camera easily accessible at all of its parts simply by removing the cover 29. At its rear wall the cover 29 is provided with an opening 30 aligned with the ocular 6c so that the subject may be viewed through the opening 30, and also the counter 27b is received in an opening 31 at the rear wall of the cover 29 so that the footage indicator will also be visible at the rear of the camera.

As is apparent from the above description and particularly from FIGS. 1 and 3, the camera structure of the invention is exceedingly thin and flat. Moreover, the size of the camera exceeds only to a slight extent the space required for the magazine, the motor 9, and the exposure-controlling means B, and of course this result is achieved in part by using a number of flat-type primary dry cells to supply the energy for operating the camera.

It will be understood that each of the elements described above, or two or more together, may also find a useful application in other types of cameras differing from the types described above.

While the invention has been illustrated and described as embodied in motion picture cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture camera, in combination, supporting frame means defining a magazine-receiving chamber and having at least one recess located beside said chamber and separated therefrom by a wall portion of said frame means; an electric motor carried by said frame means beneath and adjacent to said chamber; exposure-controlling means carried by said frame means in front of and adjacent to said chamber, the outer dimensions of the camera exceeding only slightly the space required for said chamber, said electric motor, and said exposure-controlling means; and a body substantially filling said recess and formed with a plurality of openings for receiving flat-type primary dry cells which are respectively provided with outer flanges, said body having projections which respectively extend over said flanges and said body carrying at portions of said openings which are opposed to said projections a shiftable lock means for engaging said flanges for releasably holding said cells in said openings.

2. In a motion picture camera, in combination, supporting frame means defining a magazine-receiving chamber and having at least one recess located beside said chamber and separated therefrom by a wall portion of said frame means; an electric motor carried by said frame means beneath and adjacent to said chamber; exposure-controlling means carried by said frame means in front of and adjacent to said chamber, the outer dimensions of the camera exceeding only slightly the space required for said chamber, said electric motor, and said exposure-controlling means; and a body substantially filling said recess and formed with a plurality of openings for receiving flat-type primary dry cells which are respectively provided with outer flanges, said body having projections which respectively extend over said flanges and said body carrying at portions of said openings which are opposed to said projections a shiftable lock means for engaging said flanges for releasably holding said cells in said openings, said shiftable lock means including a sector-shaped lever which has a locking position extending over the flanges of a pair of cells.

References Cited by the Examiner

UNITED STATES PATENTS

| | | | |
|---|---|---|---|
| 1,537,196 | 5/1925 | Schlicker | 352—78 X |
| 2,123,495 | 7/1938 | Becker | 352—78 |
| 2,317,810 | 4/1943 | Sauer | 95—44 X |
| 3,017,803 | 1/1962 | Sakaki | 352—76 |
| 3,103,152 | 9/1963 | Reinsch et al. | 352—141 X |
| 3,124,033 | 3/1964 | Freudenschuss | 352—141 |
| 3,166,756 | 1/1965 | Hampl | 352—78 |

FOREIGN PATENTS 514,740  11/1939  Great Britain.

JULIA E. COINER, *Primary Examiner.*